(12) United States Patent
Bethouart et al.

(10) Patent No.: US 8,182,595 B2
(45) Date of Patent: May 22, 2012

(54) CORRECTING FLUID WITH DRYING INDICATOR

(75) Inventors: Carine Bethouart, Feldkirch (FR); José Duez, Feldkirch (FR); Bernard Faure, Burnhaupt le Bas (FR)

(73) Assignee: Societe BIC, Clichy Cedex (FR)

( * ) Notice: Subject to any disclaimer, the term of this patent is extended or adjusted under 35 U.S.C. 154(b) by 150 days.

(21) Appl. No.: 12/518,804

(22) PCT Filed: Dec. 11, 2007

(86) PCT No.: PCT/FR2007/052433
§ 371 (c)(1),
(2), (4) Date: Jan. 25, 2010

(87) PCT Pub. No.: WO2008/074956
PCT Pub. Date: Jun. 26, 2008

(65) Prior Publication Data
US 2010/0163799 A1    Jul. 1, 2010

(30) Foreign Application Priority Data
Dec. 11, 2006   (FR) .................. 06 10787

(51) Int. Cl.
*C09D 10/00*   (2006.01)
(52) U.S. Cl. .................................. 106/31.32
(58) Field of Classification Search ......... 106/31.32
See application file for complete search history.

(56) References Cited

U.S. PATENT DOCUMENTS

| 5,326,388 | A | * | 7/1994 | Miller et al. | 106/31.32 |
| 5,478,382 | A | | 12/1995 | Miller et al. | |
| 6,517,622 | B1 | * | 2/2003 | Fiebag et al. | 106/31.93 |
| 2003/0226474 | A1 | * | 12/2003 | Mammen et al. | 106/31.15 |
| 2004/0065226 | A1 | * | 4/2004 | Duez et al. | 106/31.01 |
| 2004/0110869 | A1 | * | 6/2004 | Denninger et al. | 523/160 |
| 2005/0075419 | A1 | | 4/2005 | Kwan et al. | |
| 2005/0150423 | A1 | * | 7/2005 | Godbout | 106/31.32 |

FOREIGN PATENT DOCUMENTS

EP    0 705 887 A2    4/1996

OTHER PUBLICATIONS

"Correction Fluid-comprises white pigment, volatile solvent, substance whose ph changes according to reaction in air and a reagent which becomes transparent with ph changes" DERWENT, Feb. 22, 1994, XP002309542 abrege.

Database CA [online] Chemical Abstract Service, Columbus, Ohio, US; 2005, Avnir, Yuval et al Avnir, Yuval et al.: "ph determination by pyranine: medium-related artifacts and their correction ph determination by pyranine: medium-related artifacts and their correction" XP002436136 extrait se STN Database accession No. 2005:1233989 abrege & Analytical Biochemistry, 347(1) 34-41 Coden: Anbca2; ISSN: 0003-2697 Analytical Biochemistry, 347(1),34-41 Coden: Anbca2; Issn: 003-2697, 2005.

* cited by examiner

*Primary Examiner* — Emily Le
*Assistant Examiner* — Veronica F Faison
(74) *Attorney, Agent, or Firm* — Jones Day

(57) ABSTRACT

A correcting fluid with a colored drying indicator that includes as fluorescent dye, sodium 8-hydroxy-1,3,6-pyrenetrisulfonate and a good solvent for the fluorescent dye, in which the solubility of the fluorescent dye at 20° C. is at least equal to 0.1 g/l, and, a poor solvent for the fluorescent dye, in which the solubility of the fluorescent dye is less than or equal to 0.01 g/l at 20° C., the poor solvent being miscible with the good solvent for the fluorescent dye.

11 Claims, No Drawings

US 8,182,595 B2

CORRECTING FLUID WITH DRYING INDICATOR

CROSS REFERENCE TO RELATED APPLICATION

This is a national stage application of International Application No. PCT/FR2007/052433, filed on Dec. 11, 2006, the entire contents of which Applicants incorporate herein by reference.

BACKGROUND OF THE INVENTION

Field of the Invention

The embodiments of the present invention relate to a correcting fluid containing a fluorescent dye as drying indicator.

Water-based or volatile organic solvent-based correcting fluids for hiding writing errors and then writing over them, if so desired, on the dried correcting film, are available on the market. Although water-based fluids are generally preferred for their greater harmlessness, they nevertheless have the drawback, when compared with solvent-based correcting fluids, of drying much less quickly than the latter. It generally takes several tens of seconds before the film can be overwritten without damaging it. A user who is in a hurry, and who has no indication informing him of the progress of the drying, is liable to attempt to overwrite on the masking film too soon.

It is a known practice to add drying or visualization indicators to paperware compositions whose use involves a drying time after application, such as correcting fluids.

The drying indicators used in correcting fluids are intended to allow the user to evaluate visually the moment at which the composition is sufficiently dry, i.e. the moment at which the film formed by the correcting fluid can receive new inscription without the risk of being damaged.

Drying indicators, which are colored and thus visible to the user at the time of application of the composition, gradually lose their color and ideally become totally colorless when the composition is dry.

Thus, patent application US 2005/0075419 discloses a water-based correcting fluid containing, as drying indicator, a colored pH indicator. The correcting fluid also contains a volatile acid or a volatile base whose evaporation leads to a change in the pH of the correcting film and consequently to decolorization of the pH indicator.

The problem of compositions containing a colored pH indicator as drying indicator is that of precise adjustment of the decolorization time to the real drying time of the composition. Specifically, when the pH of the composition changes too quickly and the indicator becomes decolorized before the composition is fully dry, the user is led in error and early overwriting of the film will cause it to be damaged. Conversely, when the pH variation and the decolorization of the indicator do not take place until a certain time after the total drying of the composition, the user needlessly delays the moment of overwriting and thus wastes time.

The drying time of a film of correcting fluid depends on several parameters such as
- the rate of evaporation (volatility) of the solvents,
- the speed of penetration of the solvents into the paper, which depends essentially on the surface tension of the fluid, the viscosity of the fluid and the surface energy of the support, and
- the speed of formation of the film.

In the context of its research aimed at solving this problem of precise adjustment of the drying time to the decolorization time of correcting fluids, the Applicant has discovered that it is possible to very finely modulate the decolorization time of certain fluorescent dyes by using them in a system of mutually miscible solvents, formed from at least one "good" solvent for the dye and at least one "poor" solvent for said dye.

SUMMARY OF THE INVENTION

Consequently, one embodiment of the present invention is a correcting fluid with a colored drying indicator, comprising:
 (a) as fluorescent dye, sodium 8-hydroxy-1,3,6-pyrenetrisulfonate and
 (b) a good solvent for the fluorescent dye, preferably having a boiling point of less than or equal to 100° C., and, preferably,
 (c) a poor solvent for the fluorescent dye, which is miscible with the good solvent (b) for the fluorescent dye.

DETAILED DESCRIPTION OF THE INVENTION

Sodium 8-hydroxy-1,3,6-pyrenesulfonate, also known as Solvent Green 7 or pyranine (CAS 6358-69-6, Color Index No. 59040) is a green-yellow dye that is approved by the FDA as a dye for cosmetic compositions. This dye is not included among colored pH indicators. Specifically, it preferably has, over the whole pH range, a fluorescence emission whose characteristics vary too gradually for them to be able to serve as pH indicators.

The capacity of this dye to serve as a drying indicator in the compositions of the embodiments of the present invention is therefore not associated with its state of protonation/deprotonation, but, among others, with its solvatochromism in relation with its state of solvation in the solvent mixture of the composition.

Specifically, the Applicant has found that sodium 8-hydroxy-1,3,6-pyrenetrisulfonate, dissolved in a "good" solvent as defined below, is characterized by high fluorescence intensity which decreases when this good solvent is mixed with a certain proportion of a "poor" solvent for the dye, as described below.

The Applicant has also found that when the good solvent used is water, the addition of an organic solvent chosen from poor solvents for the fluorescent dye is reflected by a change, generally an acceleration, in the speed of penetration of the solvent phase into the paper support onto which the correcting fluid is applied, and that this acceleration of the penetration speed in turn has repercussions on the speed of drying of the film and the speed of decolorization of the dye.

The idea thus emerged of dissolving this fluorescent dye in a solvent phase containing a mixture of these two types of solvent, so as to modify the state of dissolution of the dye and/or the speed of penetration into the paper support in an attempt to adjust the decolorization time of the fluorescent dye precisely to the drying time of the film of correcting fluid. The Applicant has thus found that an astute choice of the good and poor solvents as a function of their volatility and of their solvating power for the dye, but above all the variation of the respective proportions of the good and poor solvents in the compositions of the embodiments of the present invention, makes it possible to very finely adjust the decolorization time of the fluorescent dye to the real drying time of the deposited film.

Although the above explanations suggest that the presence of a "poor" solvent in the compositions of the embodiments of the present invention is an essential technical characteristic of the correcting fluids according to the embodiments of the present invention, a person skilled in the art will understand that, in certain particular cases, when evaporation of only the good solvent for the fluorescent dye brings about its decolorization in coordination with the drying time of the composition, the addition of a poor solvent is superfluous. The presence of a poor solvent in combination with a good solvent is thus, admittedly, generally desirable, but nevertheless constitutes a preferred optional characteristic of the compositions of the embodiments of the present invention.

In an embodiment of the present invention, the term "good solvent" means a solvent in which the solubility of the fluorescent dye at 20° C. is at least equal to 0.1 g/l. The term "poor solvent" denotes organic solvents in which the solubility of the fluorescent dye is less than or equal to 0.01 g/l at 20° C.

As indicated hereinabove, the good solvent has a boiling point of less than or equal to 100° C. Needless to say, this good solvent is preferably water, chosen for its total harmlessness and its very low cost. Demineralized water is preferred in particular. The upper limit of the boiling point (100° C.) is dictated only by the drying time of the composition. Beyond a boiling point of 100° C., the good solvent, which constitutes the majority of the composition, would take an excessively long time to evaporate, which would lead to an undesirable lengthening of the drying time of the film.

The poor solvent must be miscible with the good solvent for the fluorescent dye. The good and poor solvents do not necessarily need to be mutually miscible in all proportions, but their miscibility must be ensured at least for the good solvent/poor solvent ratios of the correcting fluid before application and during the drying step.

Examples of preferred poor solvents that may be mentioned include C4-6 alkylene glycols such as butylene glycol and hexylene glycol, C2-4 lower alcohols such as ethanol, n-propanol, isopropanol, n-butanol and isobutanol, and dioxane.

As explained hereinabove, the decolorization time of the fluorescent dyes may be adjusted to the drying time of the compositions of the embodiments of the present invention by adding a relatively small amount of one or more poor solvents, of the order of only a few percent. The weight ratio of the good solvent to the poor solvent in the compositions of the embodiments of the present invention is preferably between 99/1 and 80/20 and in particular between 98/2 and 90/10.

The composition according to the embodiments of the present invention preferably has a basic pH, advantageously between 7 and 11 and preferably between 7.5 and 10. In this pH range, the fluorescence intensity of the fluorescent dye is, specifically, particularly high and the decolorization at the time of drying of the applied film is readily detectable by the human eye. This pH may be adjusted by adding any base, not necessarily a volatile base. Examples of such bases that may be mentioned include ammonia, triethanolamine and 2-amino-1-methylpropanol (AMP). The pH of the compositions according to the invention may optionally be fixed by means of a suitable buffer.

The concentration of the fluorescent dye in the correcting fluids of the embodiments of the present invention is preferably between 0.01% and 1% by weight and in particular between 0.1% and 0.5% by weight, relative to the total weight of the composition.

The correcting fluid of the embodiments of the present invention contains, in addition to the fluorescent dye and the solvent phase described above, one or more adjuvants commonly used in this type of composition, chosen, for example, from film-forming polymers, fillers, opacifying pigments, preferably white pigments such as titanium dioxide, optical brighteners, dyes, antifreezes such as glycerol, surfactants and preserving agents.

Examples

Composition A (without Poor Solvent)

0.15% by weight of Solvent Green 7, sold under the name Jaune Pyracide G by the company Colorey, is added to a standard correcting fluid (base fluid) having the following composition:

| | |
|---|---|
| Distilled water | 10% |
| Resin (acrylic latex 35% solids) | 25% |
| TiO2 | 37% |
| CaCO3 | 13% |
| Base qs | pH 8-8.5 |
| Other additives (preserving agents, antifoam, surfactant, optical brightener) | 12% |

A film about 75 μm thick is applied to standardized paper (Baumgartner paper ISO 12757) using a hand coater. The film is allowed to dry at a temperature of 20° C., and the time after which it is possible to overwrite on the dried film with a ballpoint pen (=drying time) is then noted.

The decolorization time of the fluorescent dye is estimated by visual evaluation or alternatively by colorimetry ($L^*a^*b^*$ system).

A drying time of the film of about 1 minute and a decolorization time of about 3 minutes are thus determined for composition A. This result is unsatisfactory because, if the user waits until the film has fully decolorized before overwriting it, he needlessly wastes about 2 minutes.

Compositions B and C (with poor solvent)

4.00% hexylene glycol (Composition B) and 4.00% n-propanol (Composition C) are added, respectively, to composition A containing 99.85% base fluid and 0.15% Solvent Green 7.

When the drying time and the decolorization time of these two compositions are measured under the same conditions as for Composition A, the following results are obtained:

Composition B:
Drying time: 1 minute
Decolorization time: 1 minute 10 seconds
Composition C:
Drying time: 50 seconds
Decolorization time: 1 minute 10 seconds It is found that, for the two compositions, the difference between the drying time and the decolorization time is substantially reduced when compared with that observed for Composition A free of secondary solvent ("poor" solvent). It may moreover be observed that the addition, to the water-based composition, of a small amount (4%) of hexylene glycol (boiling point of 197° C.) does not increase the drying time of the final composition. On the other hand, the addition of only 4% of a poor solvent that is relatively more volatile than water (n-propanol, boiling point of 97° C.) advantageously reduces the drying time of this water-based formulation (Composition C) by about 20%.

The invention claimed is:

1. A correcting fluid with a colored drying indicator, comprising:
   (a) as fluorescent dye, sodium 8-hydroxy-1,3,6-pyrenetrisulfonate and
   (b) a good solvent for the fluorescent dye, in which the solubility of the fluorescent dye at 20° C. is at least equal to 0.1 g/l, and,
   (c) a poor solvent for the fluorescent dye, in which the solubility of the fluorescent dye is less than or equal to 0.01 g/l at 20° C., the poor solvent being miscible with the good solvent (b) for the fluorescent dye, wherein the correcting fluid includes at least one opacifying pigment.

2. The correcting fluid according to claim 1, wherein the good solvent has a boiling point of less than or equal to 100° C.

3. The correcting fluid according to claim 1, wherein the concentration of the fluorescent dye is between 0.01% and 1% by weight relative to the total weight of the composition.

4. The correcting fluid according to claim 3, wherein the concentration of the fluorescent dye is between 0.1% and 0.5% by weight relative to the total weight of the composition.

5. The correcting fluid according to claim 1, wherein the good solvent is water.

6. The correcting fluid according to claim 1, wherein the poor solvent is selected from $C_{4-6}$ alkylene glycols, $C_{2-4}$ lower alcohols and dioxane.

7. The correcting fluid according to claim 1, wherein the weight ratio of the good solvent to the poor solvent is between 99/1 and 80/20.

8. The correcting fluid according to claim 7, wherein the weight ratio of the good solvent to the poor solvent is between 98/2 and 90/10.

9. The correcting fluid according to claim 1, having a pH of between 7 and 11.

10. The correcting fluid according to claim 9, having a pH of between 7.5 and 10.

11. The correcting fluid according to claim 1, wherein the opacifying pigment includes white pigments.

* * * * *